(12) United States Patent
Livshiz et al.

(10) Patent No.: US 10,399,574 B2
(45) Date of Patent: Sep. 3, 2019

(54) FUEL ECONOMY OPTIMIZATION USING AIR-PER-CYLINDER (APC) IN MPC-BASED POWERTRAIN CONTROL

(71) Applicant: GM GLOBAL TECHNOLOGY OPERATIONS LLC, Detroit, MI (US)

(72) Inventors: Michael Livshiz, Ann Arbor, MI (US); Daniele Bernardini, Milan (IT); Alberto Bemporad, Lucca (IT); Bharath Pattipati, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 114 days.

(21) Appl. No.: 15/697,748

(22) Filed: Sep. 7, 2017

(65) Prior Publication Data

US 2019/0071097 A1 Mar. 7, 2019

(51) Int. Cl.
| | |
|---|---|
| *B60W 50/00* | (2006.01) |
| *B60W 10/06* | (2006.01) |
| *B60W 10/101* | (2012.01) |
| *B60W 30/188* | (2012.01) |

(52) U.S. Cl.
CPC ........ *B60W 50/0097* (2013.01); *B60W 10/06* (2013.01); *B60W 10/101* (2013.01); *B60W 30/188* (2013.01); *B60W 2510/0619* (2013.01); *B60W 2510/0638* (2013.01); *B60W 2510/1005* (2013.01); *B60W 2510/105* (2013.01); *B60W 2510/106* (2013.01); *B60W 2520/10* (2013.01); *B60W 2540/10* (2013.01)

(58) Field of Classification Search
None
See application file for complete search history.

(56) References Cited

U.S. PATENT DOCUMENTS

| | | |
|---|---|---|
| 4,161,929 A | 7/1979 | Nohira et al. |
| 5,101,786 A | 4/1992 | Kamio et al. |
| 5,706,780 A | 1/1998 | Shirakawa |
| 5,727,528 A | 3/1998 | Hori et al. |

(Continued)

FOREIGN PATENT DOCUMENTS

| | | |
|---|---|---|
| CN | 1594846 A | 3/2005 |
| WO | 2003065135 A1 | 8/2003 |

OTHER PUBLICATIONS

John C.G. Boot, "Quadratic Programming: Algorithms, Anomalies, Applications, vol. 2 of Studies in Mathematical and Managerial Economics," North Holland Publ. Comp., 1964; 213 pages.

(Continued)

*Primary Examiner* — Jacob S. Scott
*Assistant Examiner* — Timothy Hannon

(57) ABSTRACT

A propulsion system, control system, and method are provided for optimizing fuel economy, which use model predictive control systems to generate a plurality of sets of possible command values and determine a cost for each set of possible command values of based on a first predetermined weighting value, a second predetermined weighting value, a plurality of predicted values, and a plurality of requested values. The set of possible command values having the lowest cost is determined and defined as a set of selected command values. Fuel is minimized by minimizing engine power for a requested axle power. Accordingly, a fuel consumption rate requested value is determined based on an air-per-cylinder (APC) requested value.

20 Claims, 6 Drawing Sheets

(56) References Cited

U.S. PATENT DOCUMENTS

| | | |
|---|---|---|
| 5,775,293 A | 7/1998 | Kresse |
| 5,921,219 A | 7/1999 | Frohlich et al. |
| 6,014,955 A | 1/2000 | Hosotani et al. |
| 6,155,230 A | 12/2000 | Iwano et al. |
| 6,173,226 B1 | 1/2001 | Yoshida |
| 6,532,935 B2 | 3/2003 | Ganser et al. |
| 6,606,981 B2 | 8/2003 | Itoyama |
| 6,704,638 B2 | 3/2004 | Livshiz et al. |
| 6,704,641 B2 | 3/2004 | Tashiro et al. |
| 6,826,904 B2 | 12/2004 | Miura |
| 6,840,215 B1 | 1/2005 | Livshiz et al. |
| 6,953,024 B2 | 10/2005 | Linna et al. |
| 6,993,901 B2 | 2/2006 | Shirakawa |
| 7,016,779 B2 | 3/2006 | Bowyer |
| 7,021,282 B1 | 4/2006 | Livshiz et al. |
| 7,051,058 B2 | 5/2006 | Wagner et al. |
| 7,222,012 B2 | 5/2007 | Simon, Jr. |
| 7,235,034 B2 | 6/2007 | Berglund et al. |
| 7,236,874 B2 | 6/2007 | Ichihara |
| 7,274,986 B1 | 9/2007 | Petridis et al. |
| 7,356,403 B2 | 4/2008 | Yoshioka et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 | 10/2008 | Hagari |
| 7,563,194 B2 | 7/2009 | Murray |
| 7,614,384 B2 | 11/2009 | Livshiz et al. |
| 7,698,048 B2 | 4/2010 | Jung |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,777,439 B2 | 8/2010 | Falkenstein |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,949,459 B2 | 5/2011 | Yoshikawa et al. |
| 7,967,720 B2 | 6/2011 | Martin et al. |
| 7,967,729 B2 | 6/2011 | Martin et al. |
| 7,975,668 B2 | 7/2011 | Ramappan et al. |
| 7,980,221 B2 | 7/2011 | Baur et al. |
| 8,010,272 B2 | 8/2011 | Kuwahara et al. |
| 8,027,780 B2 | 9/2011 | Whitney et al. |
| 8,041,487 B2 | 10/2011 | Worthing et al. |
| 8,050,841 B2 | 11/2011 | Costin et al. |
| 8,073,610 B2 | 12/2011 | Heap et al. |
| 8,078,371 B2 | 12/2011 | Cawthorne |
| 8,086,390 B2 | 12/2011 | Whitney et al. |
| 8,103,425 B2 | 1/2012 | Choi et al. |
| 8,103,428 B2 | 1/2012 | Russ et al. |
| 8,116,954 B2 | 2/2012 | Livshiz et al. |
| 8,121,763 B2 | 2/2012 | Hou |
| 8,176,735 B2 | 5/2012 | Komatsu |
| 8,181,627 B2 | 5/2012 | Sharples et al. |
| 8,209,104 B2 | 6/2012 | Soejima et al. |
| 8,219,304 B2 | 7/2012 | Soma |
| 8,241,177 B2 | 8/2012 | Doering et al. |
| 8,307,814 B2 | 11/2012 | Leroy et al. |
| 8,316,828 B2 | 11/2012 | Whitney et al. |
| 8,447,492 B2 | 5/2013 | Watanabe et al. |
| 8,468,821 B2 | 6/2013 | Liu et al. |
| 8,483,935 B2 | 7/2013 | Whitney et al. |
| 8,527,120 B2 | 9/2013 | Matthews et al. |
| 8,560,204 B2 | 10/2013 | Simon et al. |
| 8,566,008 B2 | 10/2013 | Soejima et al. |
| 8,593,806 B2 | 11/2013 | Huang |
| 8,594,904 B2 | 11/2013 | Livshiz et al. |
| 8,635,001 B2 | 1/2014 | Doering et al. |
| 8,739,766 B2 | 6/2014 | Jentz et al. |
| 8,744,716 B2 | 6/2014 | Kar |
| 8,862,248 B2 | 10/2014 | Yasui |
| 8,954,257 B2 | 2/2015 | Livshiz et al. |
| 8,977,457 B2 | 3/2015 | Robinette et al. |
| 9,062,631 B2 | 6/2015 | Kinugawa et al. |
| 9,067,593 B2 | 6/2015 | Dufford |
| 9,075,406 B2 | 7/2015 | Nakada |
| 9,145,841 B2 | 9/2015 | Miyazaki et al. |
| 9,175,622 B2 | 11/2015 | Seiberlich et al. |
| 9,175,628 B2 | 11/2015 | Livshiz et al. |
| 9,222,426 B2 | 12/2015 | Rollinger et al. |
| 9,243,524 B2 | 1/2016 | Whitney et al. |
| 9,328,671 B2 | 5/2016 | Whitney et al. |
| 9,334,815 B2 | 5/2016 | Cygan, Jr. et al. |
| 9,347,381 B2 | 5/2016 | Long et al. |
| 9,376,965 B2 | 6/2016 | Whitney et al. |
| 9,378,594 B2 | 6/2016 | Wong et al. |
| 9,382,865 B2 | 7/2016 | Genslak et al. |
| 9,388,754 B2 | 7/2016 | Cygan, Jr. et al. |
| 9,388,758 B2 | 7/2016 | Pochner et al. |
| 9,399,959 B2 | 7/2016 | Whitney et al. |
| 9,429,085 B2 | 8/2016 | Whitney et al. |
| 9,435,274 B2 | 9/2016 | Wong et al. |
| 9,447,632 B2 | 9/2016 | LeBlanc |
| 9,528,453 B2 | 12/2016 | Whitney et al. |
| 9,534,547 B2 | 1/2017 | Livshiz et al. |
| 9,541,019 B2 | 1/2017 | Verdejo et al. |
| 9,587,573 B2 | 3/2017 | Genslak et al. |
| 9,599,049 B2 | 3/2017 | Zavala Jurado et al. |
| 9,599,053 B2 | 3/2017 | Long et al. |
| 9,605,615 B2 | 3/2017 | Long et al. |
| 9,669,822 B2 | 6/2017 | Piper et al. |
| 9,714,616 B2 | 7/2017 | Jin et al. |
| 9,732,499 B2 | 8/2017 | Miyamoto et al. |
| 9,732,688 B2 | 8/2017 | Cygan, Jr. et al. |
| 9,765,703 B2 | 9/2017 | Whitney et al. |
| 9,784,198 B2 | 10/2017 | Long et al. |
| 9,789,876 B1 | 10/2017 | Livshiz et al. |
| 9,797,318 B2 | 10/2017 | Storch et al. |
| 9,863,345 B2 | 1/2018 | Wong et al. |
| 9,920,697 B2 | 3/2018 | Pochner et al. |
| 9,927,780 B2 | 3/2018 | Sun et al. |
| 2004/0116220 A1 | 6/2004 | Yamamoto et al. |
| 2005/0065691 A1 | 3/2005 | Cho |
| 2007/0191181 A1 | 8/2007 | Burns |
| 2009/0288899 A1 | 11/2009 | Belloso |
| 2010/0211294 A1 | 8/2010 | Soejima |
| 2012/0010860 A1 | 1/2012 | Kirkling et al. |
| 2017/0306819 A1 | 10/2017 | Alfieri et al. |
| 2017/0361842 A1 | 12/2017 | Livshiz et al. |

OTHER PUBLICATIONS

N. Lawrence Ricker, "Use of Quadratic Programming for Constrained Internal Model Control," Ind. Eng. Chem. Process Des. Dev., 1985, pp. 925-936.

C. E. Lemke, "A Method of Solution for Quadratic Programs," Rensselaer Polytechnic Institute, Troy, New York, Published Online: Jul. 1, 1962, pp. 442-453.

Kolmanovsky I., "Towards Engine and Powertrain Control Based on Model Predictive Control," Sep. 28, 2012, Powerpoint Presentation, 47 slides.

Gorinevsky, Lecture 14—Model Predictive Control Part 1: The Concept, Spring 2005, Powerpoint Presentation, 26 slides.

Bemporad, Alberto, "Model Predictive Control," Spring 2005, Powerpoint Presentation, 94 slides.

Boyd, S., "Model Predictive Control," Powerpoint Presentation, 25 slides.

U.S. Appl. No. 15/436,235, filed Feb. 17, 2017; Applicant: GM Global Technology Operations LLC; Title: Torque Security of MPC-Based Powertrain Control.

U.S. Appl. No. 15/465,647, filed Mar. 22, 2017; Applicant: GM Global Technology Operations LLC; Title: Coordination of Torque Interventions in MPC-Based Powertrain Control.

FUEL ECONOMY OPTIMIZATION USING AIR-PER-CYLINDER (APC) IN MPC-BASED POWERTRAIN CONTROL

TECHNICAL FIELD

The disclosure relates to a control system and method for a propulsion system of a motor vehicle having an engine and a transmission, and more particularly to a control system and method that uses a multivariable controller.

INTRODUCTION

Propulsion system control in a motor vehicle generally involves reading driver and vehicle inputs, such as accelerator pedal position, vehicle sensor data, and torque requests, and communicating these inputs to an Engine Control Module (ECM) and a Transmission Control Module (TCM). The ECM may calculate a driver axle torque requested from the driver and vehicle inputs. The driver axle torque requested may then be communicated to the engine and to the ECM. The engine is controlled based on the desired driver axle torque to produce an actual axle torque. Meanwhile, and typically concurrently with calculating desired engine and axle torques, a desired speed or gear ratio is calculated from the desired axle torque and the vehicle speed. The desired gear ratio, or CVT pulley ratio, is then communicated to the transmission. The transmission is controlled based on the desired gear ratio (or CVT pulley ratio) to produce an actual gear or pulley ratio. The actual axle torque and the actual gear or pulley ratio define the operating conditions of the motor vehicle.

While this system of propulsion system control is useful for its intended purpose, there is room in the art for improvements that provide dynamic control of the axle torque to balance drivability, performance, and fuel economy, especially in propulsion systems having a continuously variable transmission. Engine control systems have been developed to control engine output torque to achieve a desired torque. Traditional engine control systems, however, may not control the engine output torque as accurately as desired.

SUMMARY

A method and system are provided to control a parameter, such as a vehicle acceleration, in a vehicle propulsion system while optimizing fuel economy, through the use of model predictive control. Minimization of fuel is achieved by minimizing engine power for a requested axle torque. Thus, a fuel consumption rate requested is determined based on an air-per-cylinder (APC) requested value.

In one form, which may be combined with or separate from other forms disclosed herein, a method for controlling a propulsion system of a motor vehicle is provided. The method includes generating a plurality of sets of possible command values and determining a cost for each set of possible command values based on a first predetermined weighting value, a second predetermined weighting value, a plurality of predicted values, and a plurality of requested values. The plurality of requested values includes a fuel consumption rate requested value. The method includes determining the fuel consumption rate requested value based on an air-per-cylinder (APC) requested value. The method further includes determining which set of possible command values of the plurality of sets of possible command values has a lowest cost and selecting the set of possible command values that has the lowest cost to define a set of selected command values.

In another form, which may be combined with or separate from the other forms disclosed herein, a control system is provided for a propulsion system of a motor vehicle having a transmission and an engine. The control system includes a command generator module configured to generate a plurality of sets of possible command values. The control system further includes a cost module configured to determine a cost for each set of possible command values based on a first predetermined weighting value, a second predetermined weighting value, a plurality of predicted values, and a plurality of requested values, where the plurality of requested values includes a fuel consumption rate requested value determined based on an air-per-cylinder (APC) requested value. The cost module is further configured to determine which set of possible command values of the plurality of sets of possible command values has a lowest cost. A selection module is configured to select the set of possible command values that has the lowest cost to define a set of selected command values.

In yet another form, which may be combined with or separate from the other forms disclosed herein, a propulsion system for a motor vehicle is provided. The propulsion system includes an engine operable to power the motor vehicle, the engine having an engine output shaft configured to transfer engine output torque. The propulsion system also includes a continuously variable transmission having a variator assembly including a first pulley and a second pulley. The first and second pulleys are rotatably coupled by a rotatable member, at least one of the first and second pulleys including a movable sheave translatable along an axis to selectively change a transmission ratio between the engine output shaft and a transmission output shaft. A drive axle os configured to be driven via the transmission output shaft, the drive axle being configured to output axle torque to a set of wheels. The propulsion system further includes a control system having a prediction module, a steady state optimizer module, a cost module, and a selection module. The prediction module is configured to generate a plurality of predicted actual axle torque values and a plurality of predicted actual fuel consumption rate values based on a plurality of sets of possible command values, where the plurality of sets of possible command values includes a plurality of possible commanded transmission ratio values and a plurality of possible commanded engine torque values. The steady-state optimizer module is configured to determine a fuel consumption rate requested value based on an air-to-cylinder (APC) requested value determined based at least in part on a raw APC reference value. The raw APC reference value is determined based on the following equation:

$$APC_{r\_raw} = k * \frac{P_{a\_r} * FP * AF}{c * RPM}$$

where $APC_{r\_raw}$ is the raw APC reference value, k is a constant, $P_{a\_r}$ is an axle power requested value, FP is a firing period, AF is an air/fuel ratio, c is an engine power-to-fuel ratio, and RPM is an estimated engine speed. The cost module configured to determine a cost for each set of possible command values based on a predicted actual axle torque value, a predicted actual fuel consumption rate value, a first predetermined weighting value, a second predetermined weighting value, and a plurality of requested values, where the plurality of requested values includes an axle torque requested value, an engine output torque requested value, a transmission ratio requested value, and the fuel consumption rate requested value. The cost module is further configured to determine which set of possible command values has a lowest cost. The selection module is configured to select the set of possible command values that has the lowest cost to define a set of selected command values.

Further additional features may be provided, including but not limited to the following: the method and/or control system being configured to select the APC requested value from the lower of a computed APC reference value and a measured APC value; the method and/or control system being configured to determine the computed APC reference value based on an estimated engine speed and an axle power requested value; and the method and/or control system being configured to determine the computed APC reference value based on a raw APC reference value ($APC_{r\_raw}$).

Furthermore, the method and/or control system may be configured to determine the raw APC reference value ($APC_{r\_raw}$) based on the following equation:

$$APC_{r\_raw} = k * \frac{P_{a\_r} * FP * AF}{c * RPM}$$

where $APC_{r\_raw}$ is the raw APC reference value, k is a constant, $P_{a\_r}$ is an axle power requested value, FP is a firing period, AF is an air/fuel ratio, c is an engine power-to-fuel ratio, and RPM is an estimated engine speed. The method and/or control system may be configured to determine the axle power requested value ($P_{a\_r}$) based on the following equation:

$$P_{a\_r} = \frac{T_{a\_r} * V}{radius * 3600}$$

where $P_{a\_r}$ is the axle power requested value, $T_{a\_r}$ is an axle torque requested value, V is vehicle speed, and radius is wheel radius.

Further additional features may include: the method and/or control system being configured to determine the engine power-to-fuel ratio c based on an engine power requested value divided by a fuel requested value, wherein each of the engine power requested value and the fuel requested value may be functions of the estimated engine speed (RPM) and an engine torque requested value; the method and/or control system being configured to determine the estimated engine speed (RPM) based on the vehicle speed (V) and a transmission ratio requested value; wherein the plurality of sets of possible command values includes a plurality of commanded engine output torque values and the set of selected command values includes a selected engine output torque value; the method and/or control system being configured to generate a plurality of predicted actual axle torque values and a plurality of predicted actual fuel consumption rate values based on the plurality of sets of possible command values; the plurality of sets of possible command values including a plurality of possible commanded transmission ratio values; the method and/or control system being configured to determine the cost for each set of possible command values further based on a predicted actual axle torque value of the plurality of predicted axle torque values and a predicted actual fuel consumption rate value of the plurality of predicted actual fuel consumption rate values.

In addition, the method and/or control system may be configured to determine the plurality of predicted actual axle torque values and the plurality of predicted actual fuel consumption rate values with the following set of equations:

$$x_{k+1} = \left\{ A * x_k + B * \begin{bmatrix} Te\_c \\ Rat\_c_k \end{bmatrix} + v \right\} + K_{KF} * \left( \begin{bmatrix} Te\_m_k \\ FR\_m_k \\ Rat\_m_k \\ Ta\_m_k \end{bmatrix} - \begin{bmatrix} Te\_a_k \\ FR\_a_k \\ Rat\_a_k \\ Ta\_a_k \end{bmatrix} \right)$$

$$\begin{bmatrix} Ta\_a_{k+1} \\ FR\_a_{k+1} \end{bmatrix} = C * x_{k+1} + w$$

where
$x_{k+1}$=state variable at a prediction step k+1;
$x_k$=state variable at a prediction step k;
A=a state matrix;
B=an input matrix;
Te_c=engine output torque commanded at the prediction step k;
$Rat\_c_k$=transmission ratio commanded at the prediction step k;
$K_{KF}$=Kalman filter gain;
$Te\_a_k$=predicted actual engine output torque at the prediction step k;
$FR\_a_k$=predicted actual fuel consumption rate at the prediction step k;
$Rat\_a_k$=predicted actual transmission ratio at the prediction step k;
$Ta\_a_k$=predicted actual axle torque at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k;
$Ta\_a_{k+1}$=predicted actual axle torque at the prediction step k+1;
$FR\_a_{k+1}$=predicted actual fuel consumption rate at the prediction step k+1;
C=an output matrix;
v=process noise; and
w=measurement noise.

Further, the method and control system may be configured to determine the plurality of costs with the following cost equation:

$$\text{Cost} = \Sigma(y(i|k) - y_{ref})^T Q_Y (y(i|k) - y_{ref}) +$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix} \quad y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix} \quad u_{ref} = \begin{bmatrix} Te\_r \\ Rat\_r \end{bmatrix}$$

where
Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
Te_c=commanded engine output torque;
Rat_c=commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

Further additional features may include: the control system further comprising a prediction module configured to generate a plurality of predicted actual axle torque values and a plurality of predicted actual fuel consumption rate values based on the plurality of sets of possible command values; the plurality of requested values including the fuel consumption rate requested value, an axle torque requested value, an engine output torque requested value, and a transmission ratio requested value; and the control system further comprising a steady state optimizer module configured to: determine an accelerator pedal position (PP), determine the estimated engine speed (RPM), determine the vehicle speed (V), determine the air-fuel ratio (AF), determine the axle torque requested value (Ta_r) based on the accelerator pedal position (PP) and the vehicle speed (V), determine the transmission ratio requested value (Rat_r) based on the axle torque requested value (Ta_r) and the vehicle speed (V), determine the engine output torque requested value (Te_r) based on the axle torque requested value (Ta_r), the transmission ratio requested value (Rat_r), and a final drive ratio (FD), and determine the APC requested value.

Additional features, aspects and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
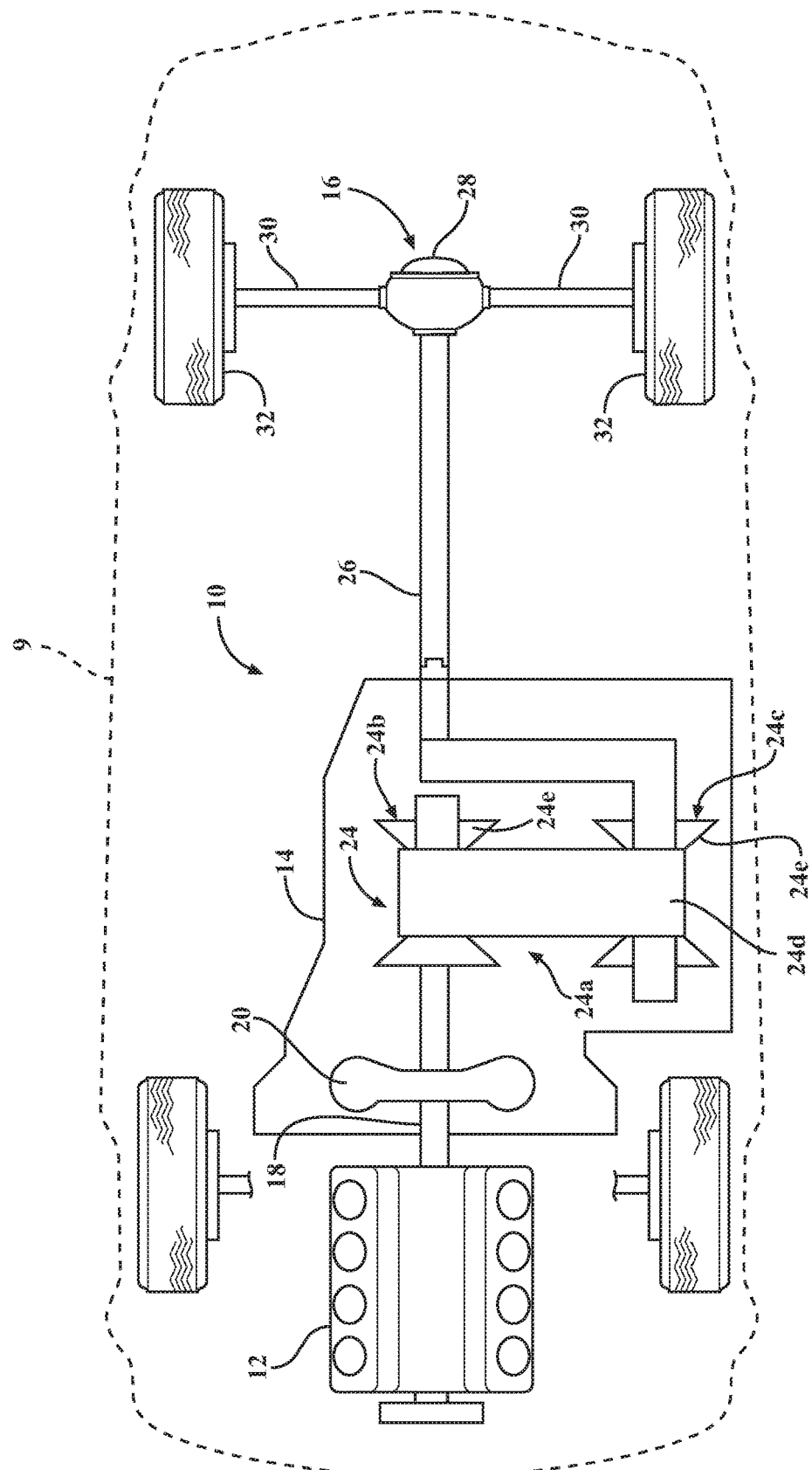
FIG. 1 is a schematic diagram of a motor vehicle having an exemplary propulsion system, in accordance with the principles of the present disclosure.

With reference to FIG. 1, an exemplary motor vehicle is shown and generally indicated by reference number 9. The motor vehicle 9 is illustrated as a passenger car, but it should be appreciated that the motor vehicle 9 may be any type of vehicle, such as a truck, van, sport-utility vehicle, etc. The motor vehicle 9 includes an exemplary propulsion system 10. It should be appreciated at the outset that while a rear-wheel drive propulsion system 10 has been illustrated, the motor vehicle 9 may have a front-wheel drive propulsion system without departing from the scope of the present disclosure.

The propulsion system 10 generally includes an engine 12 interconnected with a transmission 14 and a final drive unit 16. The engine 12 may be a conventional internal combustion engine or an electric engine, hybrid engine, or any other type of prime mover, without departing from the spirit and scope of the present disclosure. The engine 12 supplies a driving engine output torque to the transmission 14 via a crankshaft or engine output shaft 18. The driving engine output torque may be transmitted through a flexplate and/or starting device 20 to the transmission 14. The starting device 20 may be a hydrodynamic device, such as a fluid coupling or torque converter, a wet dual clutch, or an electric motor, by way of example. Torque is then transmitted from the starting device 20 to at least one transmission input shaft 22.

The transmission 14 may be a stepped transmission having planetary gears, a countershaft transmission, a continuously variable transmission, or an infinitely variable transmission. Torque from the transmission input shaft 22 is communicated through a ratio control unit 24 to a transmission output shaft 26. Generally, the ratio control unit 24 provides a plurality of forward or reverse speed or gear ratios, or an infinite number of forward or reverse speed or gear ratios, between the transmission input shaft 22 and the transmission output shaft 26.

Where the transmission 14 is a continuously variable transmission, the ratio control unit 24 may include a variator assembly 24a having first and second pulleys 24b, 24c that are rotatably coupled by an endless rotatable member 24d wrapped around the variable diameter pulleys 24b, 24c. At least one of the first and second pulleys 24b, 24c includes a movable sheave 24e translatable along an axis to selectively change a gear ratio between the engine output shaft 18 and the transmission output shaft 26.

The transmission output shaft 26 communicates output torque to the final drive unit 16. The final drive unit 16 generally includes a differential 28 that transfers axle torque through drive axles 30 to drive wheels 32.

Figure 2:
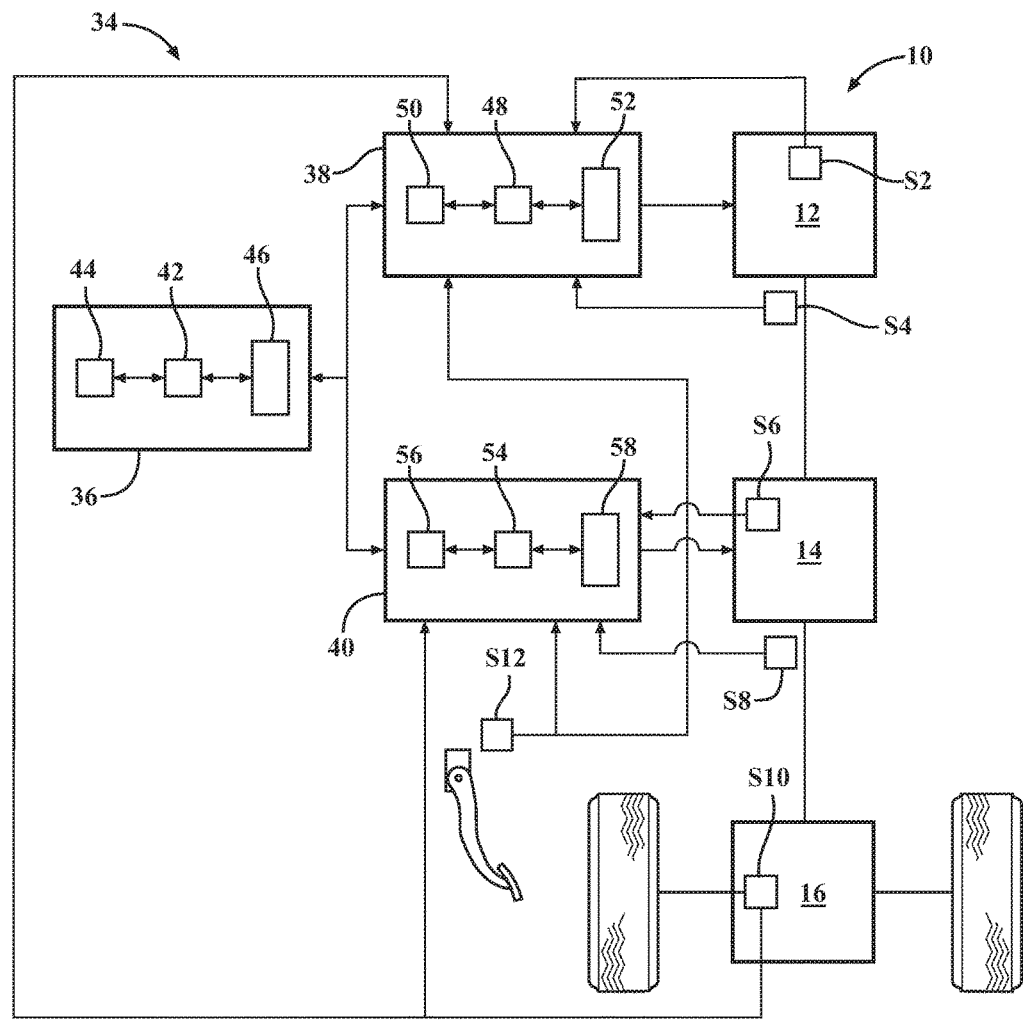
FIG. 2 is a schematic diagram showing a propulsion control system for use with the propulsion system shown in FIG. 1, according to the principles of the present disclosure.

Turning now to FIG. 2, a vehicle propulsion control system for use with the exemplary propulsion system 10 is generally indicated by reference number 34. The vehicle propulsion control system 34 includes a supervisory control module 36 in electronic communication with an engine control module 38 and a transmission control module 40. The modules 36, 38, and 40 may communicate through a vehicle network or cable area network (CAN) bus. The vehicle propulsion control system 34 may include or communicate with various other control modules, such as a body control module or infotainment control module. Alternatively, the supervisory control module 36 may be subsumed within the engine control module 38 or transmission control module 40.

The supervisory control module 36 is a non-generalized, electronic control device having a preprogrammed digital computer or processor 42, memory or non-transitory computer readable medium 44 used to store data such as control logic, instructions, image data, lookup tables, etc., and a plurality of input/output peripherals or ports 46. The processor 42 is configured to execute the control logic or instructions.

The engine control module 38 is a non-generalized, electronic control device having a preprogrammed digital computer or processor 48, memory or non-transitory computer readable medium 50 used to store data such as control logic, instructions, image data, lookup tables, etc., and a plurality of input/output peripherals or ports 52. The processor 48 is configured to execute the control logic or instructions. The engine control module 38 communicates with, and controls, the engine 12.

The transmission control module 40 is a non-generalized, electronic control device having a preprogrammed digital computer or processor 54, memory or non-transitory computer readable medium 56 used to store data such as control logic, instructions, image data, lookup tables, etc., and a plurality of input/output peripherals or ports 58. The processor 54 is configured to execute the control logic or instructions. The transmission control module 40 communicates with, and controls, the transmission 14.

The vehicle propulsion control system 34 communicates with a plurality of sensors connected to the propulsion system 10 including an air flow sensor S2 in the engine 12, an engine speed sensor S4, a transmission input shaft speed sensor S6, a transmission output shaft speed sensor S8, a vehicle speed sensor S10, and a pedal position sensor S12. The air flow sensor S2 and the engine speed sensor S4 communicate with the engine control module 38. The transmission input shaft speed sensor S6 and the transmission output shaft speed sensor S8 communicate with the transmission control module 40. The vehicle speed sensor S10 and the pedal position sensor S12 communicate with both the engine control module 38 and the transmission control module 40.

Figure 3:
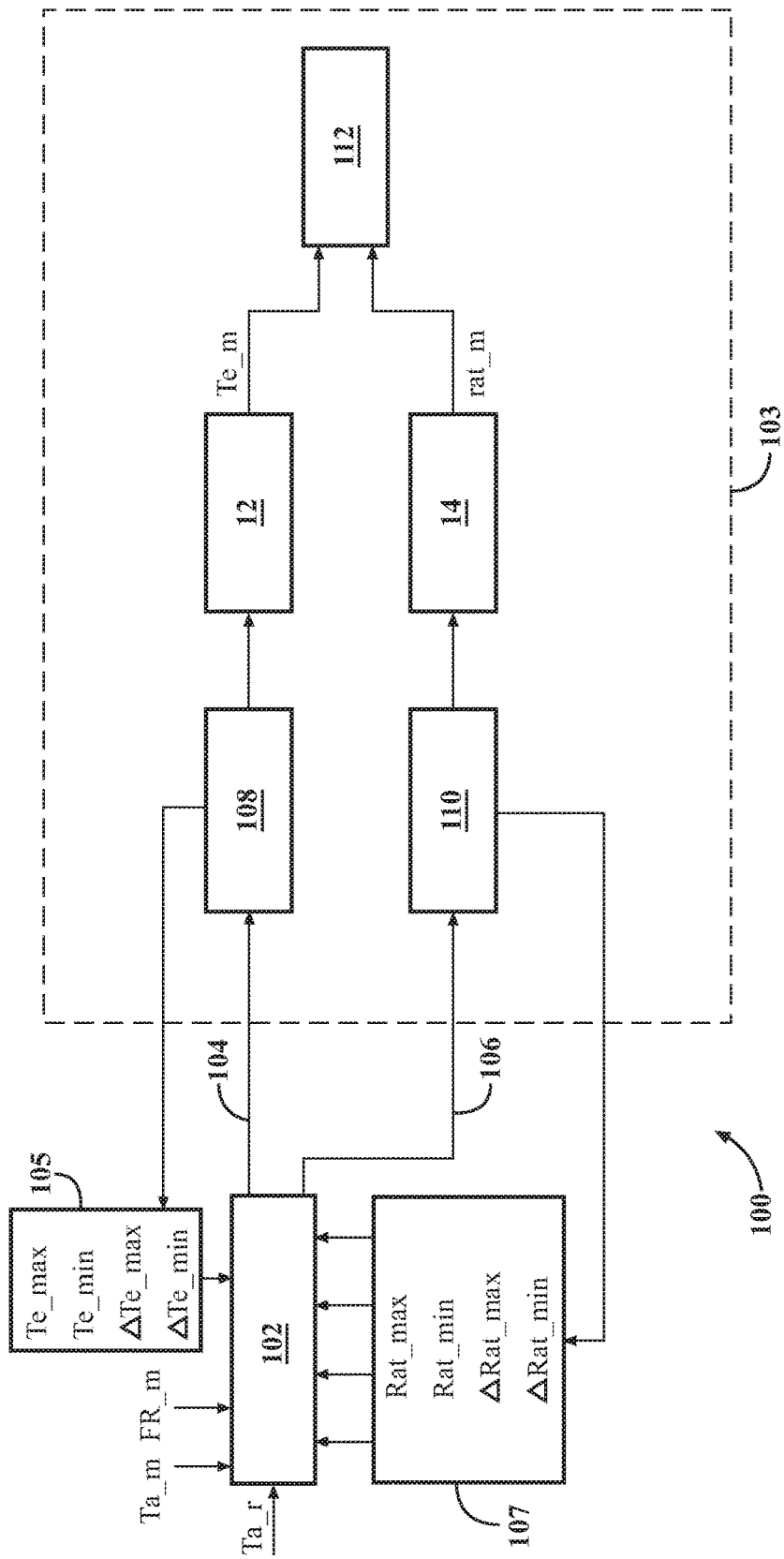
FIG. 3 is a schematic diagram of a control system for use with the propulsion control system shown in FIG. 2, in accordance with the principles of the present disclosure.

With reference to FIG. 3, and continued reference to FIGS. 1 and 2, a control diagram for the vehicle propulsion control system 34 is illustrated. The control diagram illustrates a control system or method 100 for controlling a parameter, such as vehicle acceleration, while optimizing fuel economy, which utilizes a multivariable controller. The control system 100 includes a multivariable controller 102 and a plant 103 that is controlled by the multivariable controller 102. The multivariable controller 102 may iteratively control an engine output torque Te 104 and a transmission ratio Rat 106 to optimize a fuel consumption rate FR and to achieve a desired axle torque Ta. The axle torque Ta is the amount of torque at the vehicle axle 30. Inputs to the multivariable controller 102 include a measured actual axle torque Ta_m, a measured fuel consumption rate FR_m, and an axle torque requested Ta_r, which may be based on driver and vehicle inputs and/or an axle torque intervention, which will be discussed in further detail below.

The control system 100 may include an engine torque controller 108, a transmission ratio controller 110 (which may be a variator controller for CVTs), and a vehicle dynamics module 112. In some examples, the multivariable controller 102 is stored and executed by the supervisory control module 36, the engine torque controller 108 is stored and executed by the engine control module 38, and the transmission ratio controller 110 is stored and executed by the transmission control module 40. The vehicle dynamics module 112 may be stored and executed by the engine control module 38, the transmission control module 40, or any other control module or a combination of control modules.

The multivariable controller 102 may optionally receive system limitations 105 from the engine controller 108 including a maximum engine output torque $Te_{max}$, a minimum engine output torque $Te_{min}$, a maximum rate of change of engine output torque $\Delta Te_{max}$, and a minimum rate of change of engine output torque $\Delta Te_{min}$. The multivariable controller 102 may also optionally receive system limitations 107 from the transmission ratio controller 110 including a maximum transmission ratio $Rat_{max}$, a minimum transmission ratio $Rat_{min}$, a maximum rate of change of transmission ratio $\Delta R_{max}$, and a minimum rate of change of transmission ratio $\Delta R_{min}$.

Figure 4:
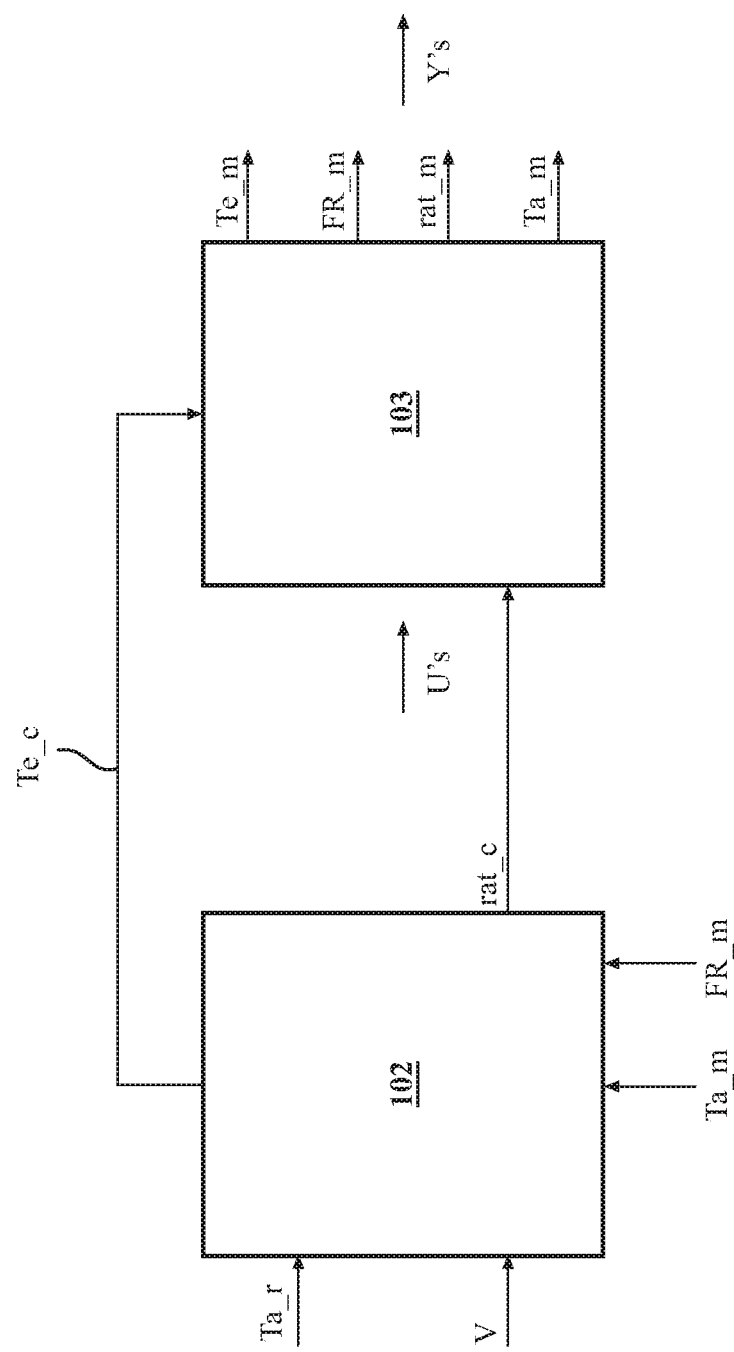
FIG. 4 is a schematic diagram illustrating additional details of the control system shown in FIG. 3, according to the principles of the present disclosure.

Referring now to FIG. 4, another representation of the control system 100 is illustrated, showing inputs and outputs to the multivariable controller 102 and the plant 103 controlled by the multivariable controller 102. For example, inputs to the multivariable controller 102 may include an axle torque requested Ta_r and vehicle speed V. Feedback inputs of axle torque measured Ta_m and fuel consumption rate measured FR_m may also be input to the multivariable controller 102. Outputs of the multivariable controller 102 may include an engine output torque commanded Te_c and a transmission ratio commanded Rat_c. These controlled outputs, or "u" variables (Te_c and Rat_c), of the multivariable controller 102 may be inputs to the plant 103, which includes the engine 12 and transmission 14.

The engine output torque commanded Te_c is used to control the engine 12 to result in an actual engine output torque, which is the measured engine output torque Te_m. The transmission ratio commanded Rat_c is used to control the transmission 14 to provide an actual measured gear ratio or pulley ratio Rat_m between the transmission input shaft 22 and the transmission output shaft 26. Thus, the plant 103 outputs the "y" variables, the values that may be tracked, which may include actual measured engine torque Te_m, actual measured fuel consumption rate FR_m, actual measured transmission ratio (or pulley ratio) Rat_m, and actual measured axle torque Ta_m.

Figure 5:
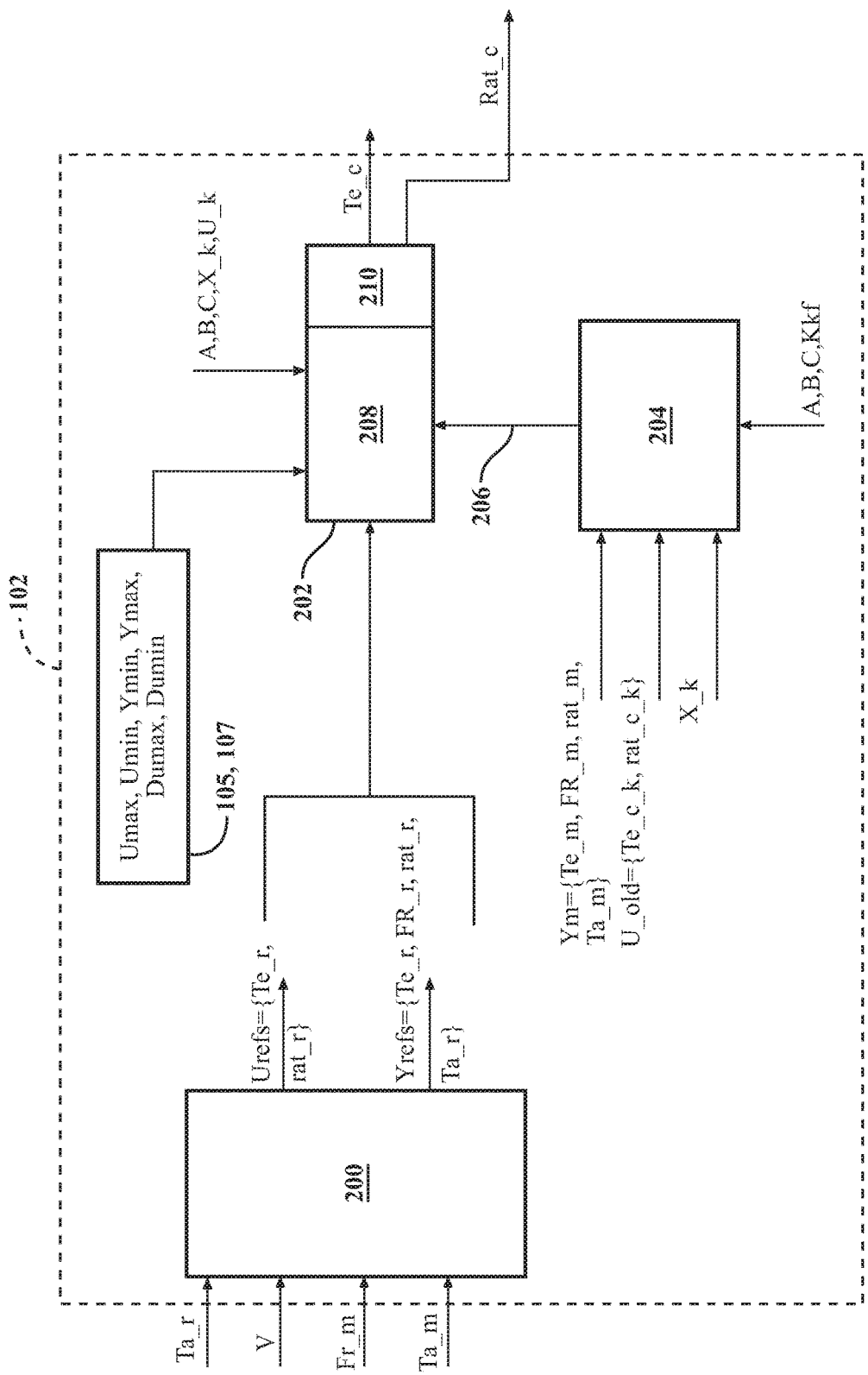
FIG. 5 is a schematic diagram illustrating additional details of a multivariable controller of the control system shown in FIGS. 3-4, in accordance with the principles of the present disclosure.
Figure 6:
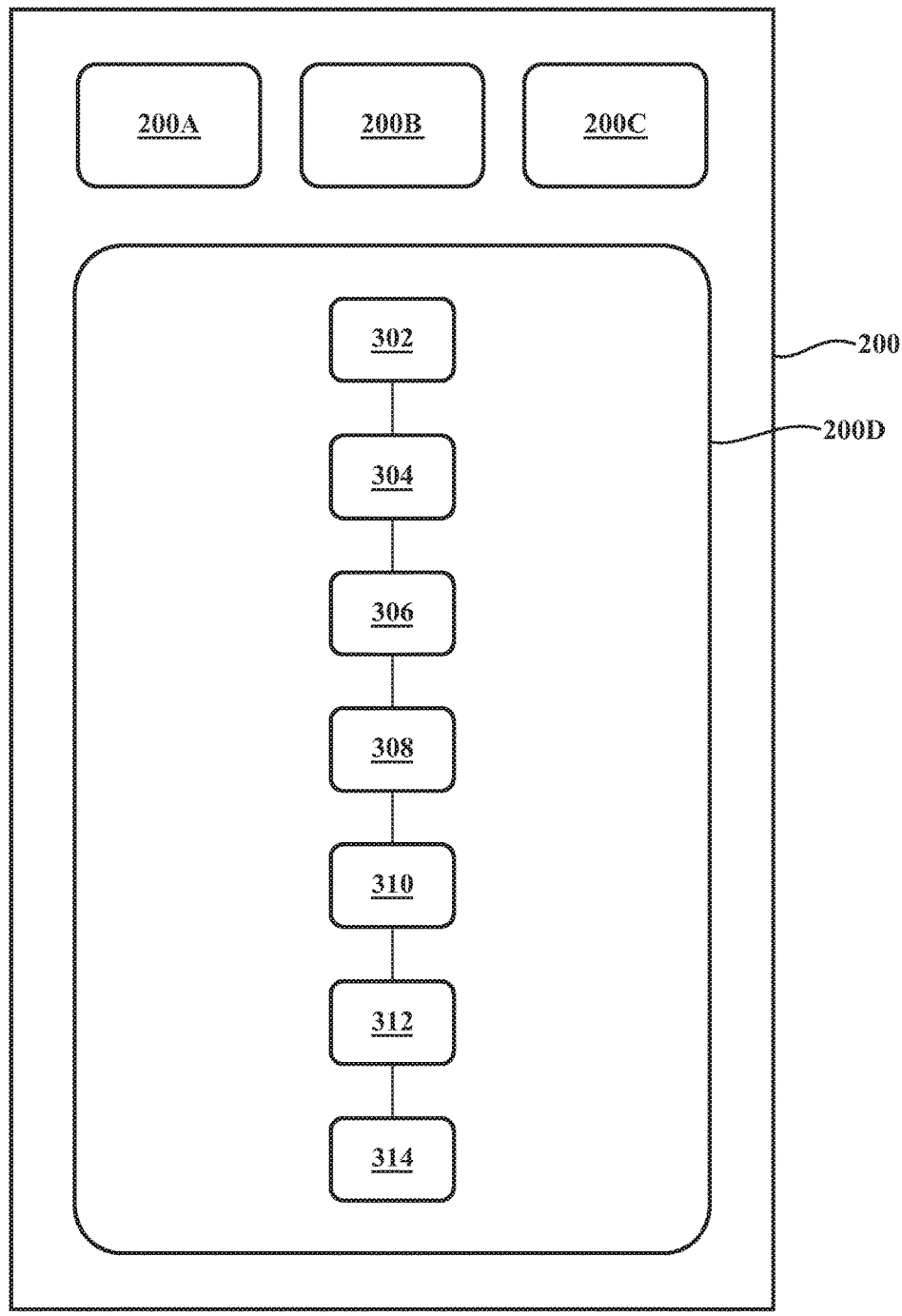
FIG. 6 is a block diagram illustrating sub-modules a steady state optimizer module of the control system shown in FIGS. 3-4, according to the principles of the present disclosure.

Referring now to FIGS. 5-6, additional details of the multivariable controller 102 are illustrated. The multivariable controller 102 includes a steady state optimizer module 200, which is a reference generator. The steady state optimizer module 200 determines reference values (desired or requested values) for the "u" variables (controlled variables) and the "y" variables (the optimized output variables that may be tracked). For example, the steady state optimizer module 200 is configured to determine an engine output torque requested value Te_r, a transmission ratio requested value Rat_r, a fuel consumption rate requested value FR_r, and an axle torque requested value Ta_r. Thus, the steady state optimizer module 200 includes a sub-module 200A for determining the engine output torque requested value Te_r, a sub-module 200B for determining the transmission ratio requested value Rat_r, a sub-module 200C for determining the axle torque requested value Ta_r, and a sub-module 200D for determining the fuel consumption rate requested value FR_r. The $u_{refs}$ include the engine output torque requested value Te_r and the transmission ratio requested value Rat_r, while the $y_{refs}$ may include all four of the engine output torque requested value Te_r, the transmission ratio requested value Rat_r, the fuel consumption rate requested value FR_r, and the axle torque requested value Ta_r. The $u_{refs}$ and the $y_{refs}$ are values that are desirable during a steady state. The MPC module 202, described below, optimizes the trajectory, particularly of the fuel consumption rate, during the transient from one steady state to another.

The axle torque requested value Ta_r may be determined (e.g., in the sub-module 200C) based on the accelerator pedal position PP and the vehicle speed V. For example, $$Ta\_r = f(PP, V). \tag{1}$$

In some examples, the axle torque requested value Ta_r may be determined from a lookup table or 2D map from a vehicle speed V sensed by vehicle speed sensor S10 and an accelerator pedal position PP sensed by the pedal position sensor S12.

The transmission ratio requested value Rat_r may be determined (e.g., in the sub-module 200B) based on the axle torque requested value Ta_r and the vehicle speed V. For example, $$Rat\_r = f(Ta\_r, V). \tag{2}$$

The engine output torque requested value Te_r may be determined (e.g., in the sub-module 200A) based on the axle torque requested value Ta_r, the transmission ratio requested value Rat_r, and the final drive ratio FD (which is constant for a given vehicle). For example, $$Te\_r = \frac{Ta\_r + Loss}{Rat\_r * FD}. \tag{4}$$

The "loss" factor may encompass mechanical losses, such as friction and pulley clamping losses, by way of example.

Minimization of fuel is achieved by minimizing engine power for requested axle power. Accordingly, the fuel consumption rate requested value FR_r may be based on an air-per-cylinder (APC) requested value. In some forms, the FR_r used may be unequal to the APC requested. One exemplary method and control module system for determining the APC requested is illustrated in FIG. 6 within the block showing sub-module 200D of the steady state optimizer 200. It should be understood that the steps or sub-modules 302, 304, 306, 308, 310, 312, 314 are exemplary and are not all required to determine the APC requested.

For example, the sub-module 200D may include a control, step, or module 302 configured to compute a firing period, or a period between firing events of the engine cylinders. The firing period may be determined, by way of example, from the following equation:

$$FP = \frac{120,000}{\#Cyl} \tag{5}$$

where FP is the firing period, #Cyl is the number of active engine cylinders, and 120,000 is a constant that could be substituted with any other suitable constant, depending on the parameters of the particular engine. In addition, it should be understood that the firing period FP could be calculated in any other suitable way without falling beyond the spirit and scope of the present disclosure.

To ultimately determine the APC requested, the sub-module may further include a control, step, or module 304 configured to compute an estimated engine speed. The estimated engine speed may be calculated from the vehicle speed, the transmission ratio requested value Rat_r, and a constant, such as with the following equation (6):

$$RPM = V * Rat\_r * \alpha_1 \tag{6}$$

where RPM is the estimated engine speed, V is the vehicle speed, Rat_r is the transmission ratio requested value, and $\alpha_1$ is a coefficient relating estimated engine speed to the transmission ratio requested. In the alternative, the engine speed RPM could be determined from the engine speed sensor S4 or in any other suitable way. If the measured or estimated engine speed is less than an idle speed, the sub-module 304 may be configured to set the estimated engine speed equal to the idle speed.

The module 200D may then be configured, in a control, step, or module 306, to determine an engine power-to-fuel ratio c based on an engine power requested value divided by a fuel requested value, wherein each of the engine power requested value and the fuel requested value are functions of the estimated engine speed (RPM) and the engine torque requested value Te_r. For example, the engine power-to-fuel ratio c may be determined from the following equation (7):

$$C = \frac{Power(RPM, Te\_r)}{Fuel(RPM, Te\_r)} \tag{7}$$

where c is a ratio value that is computed based on the relationship of engine power requested or required to fuel requested or required. Thus, Power is the engine power requested or required, and Fuel is the fuel requested or required. Each of Power and Fuel are functions of estimated engine speed and engine torque requested. In practice, the c ratio or its components may be stored in a lookup table or other database of values within the system.

The module 200D may further include a control or step 308 configured to determine an axle power requested value, such as from the following equation (8):

$$P_{a\_r} = \frac{Ta\_r * V}{radius * 3600} \tag{8}$$

Where $P_{a\_r}$ is an axle power requested value, Ta_r is an axle torque requested value, V is vehicle speed, and radius is wheel radius. 3600 is a constant, and other constants could be used depending on the particular parameters of the engine used.

The module 200D may also include a control or step 310, in which a raw APC reference value is determined based on the estimated engine speed and the axle power requested value $P_{a\_r}$. For example, the raw APC reference value ($APC_{r\_raw}$) may be determined based on the following equation (9):

$$APC_{r\_raw} = k * \frac{P_{a\_r} * FP * AF}{c * RPM} \tag{9}$$

where $APC_{r\_raw}$ is the raw APC reference value, k is a constant, $P_{a\_r}$ is the axle power requested value, FP is the firing period, AF is the air/fuel ratio, c is the engine power-to-fuel ratio (described above), and RPM is the estimated engine speed. In some forms, the numerator may also be multiplied by an additional coefficient, $\alpha_2$. The air-fuel ratio AF is the ratio of the mass of air to the mass of fuel, which may be reported by a fuel control module, by way of example.

The raw APC reference value $APC_{r\_raw}$ may be rate limited, if desired. For example, the sub-module 200D may include a sub-module, control, or step 312 where the raw APC reference value is bounded or limited by a minimum APC and a maximum APC, for example:

$$APC_{min} < APC_{r\_raw} < APC_{max} \quad (10).$$

In addition, the $APC_{r\_raw}$ value may be further refined by using a first-order low-pass filter to computer a refined APC value, $APC_r$. For example, equation (11) may be applied:

$$APC_r = \frac{APC_{r\_raw}}{\tau * s + 1}. \quad (11)$$

In sub-module, control, or step 314, an APC requested value $APC_{r\_f}$ may be determined by selecting the APC requested value from the lower of a computed APC reference value and an estimated APC value. The computed APC reference value may be the raw APC reference value $APC_{r\_raw}$ or the refined APC reference value $APC_r$. For example, equation (12) may be applied:

$$APC_{r\_f} = mm(APC_r, APC_{estimate}) \quad (12).$$

where $APC_{r\_f}$ is the computed APC reference value, APC is the refined APC value computed from equation (11) (in the alternative, $APC_{r\_raw}$ could be used), and $APC_{estimate}$ is an estimated APC value that may also sometimes be referred to as a measured APC.

Referring back to FIG. 5, once the requested values, or reference values, are determined, the steady state optimizer module 200 outputs them (the u_refs and the y_refs) to the MPC module 202. The MPC module 202 uses model predictive control and may also be referred to as a quadratic programming solver, such as a Dantzig QP solver.

A prediction module 204 is configured to predict at least an actual axle torque and an actual fuel consumption rate for use in the MPC module 202. The prediction module 204 may also be referred to as a state observer, which uses a Kalman filter. The predicted actual values 206 are output from the prediction module 204 to the MPC module 202.

The prediction module 204 is configured to generate a plurality of predicted actual axle torque values and fuel consumption rate values. For example, the prediction module generates at least a first predicted actual axle torque value and a first predicted actual fuel consumption rate value based on a first set of possible command values (which may be generated, for example, by a command generator module formed as part of the prediction module 204 or the MPC module 202), where the first set of possible command values includes a first commanded engine output torque value Te_c and a first commanded transmission ratio value Rat_c. The prediction module 204 is further configured to generate at least a second predicted actual axle torque value and a second predicted actual fuel consumption rate value based on a second set of possible command values, where the second set of possible command values includes a second commanded engine output torque value Te_c and a second commanded transmission ratio value Rat_c. In practice, a much larger number of predicted values may be generated based on additional sets of possible command values (third, fourth, fifth, etc. sets of possible Te_c and Rat_c values). The predicted actual values 206 are output to the MPC module 202.

The MPC module 202 contains a cost module 208 that is configured to determine a first cost for the first set of possible command values Te_c, Rat_c based on at least first and second predetermined weighting values, the first predicted actual axle torque value, the first predicted actual fuel consumption rate value, the axle torque requested value Ta_r, the engine output torque requested value Te_r, the transmission ratio requested value Rat_r, and the fuel consumption rate requested value FR_r. Similarly, the cost module 208 is configured to determine a second cost for the second set of possible command values Te_c, Rat_c based on at least the first and second predetermined weighting values, the second predicted actual axle torque, the second predicted actual fuel consumption rate value, the axle torque requested value Ta_r, the engine output torque requested value Te_r, the transmission ratio requested value Rat_r, and the fuel consumption rate requested value FR_r. Likewise, many more additional costs may be determined based on additional sets of predicted values and command values, in order to optimize for the lowest cost.

The MPC module 202 may also include a selection module 210 configured to select one of the plurality of sets of possible command values Te_c, Rat_c based on the lowest of the determined costs and set a selected engine output torque value Te_c and a selected transmission ratio value Rat_c equal to, or based on, the possible command values Te_c, Rat_c of the selected one of the plurality of possible sets.

The cost module 202 may be configured to determine the plurality of costs, with the following cost equation (13):

$$\text{Cost} = \Sigma(y(i|k) - y_{ref})^T Q_Y (y(i|k) - y_{ref}) + \quad (13)$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix} \quad y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix} \quad u_{ref} = \begin{bmatrix} Te\_r \\ Rat\_r \end{bmatrix}$$

where Te_a=predicted actual engine output torque; FR_a=predicted actual fuel consumption rate; Rat_a=predicted actual transmission ratio; Ta_a=predicted actual axle torque; Te_r=engine output torque requested; FR_r=fuel consumption rate requested; Rat_r=transmission ratio requested; Ta_dr=driver axle torque requested; Te_c=commanded engine output torque; Rat_c=commanded transmission ratio; $Q_y$=a first predetermined weighting value; $Q_u$=a second predetermined weighting value; $Q_{\Delta u}$=a third predetermined weighting value; i=index value; k=prediction step; and T=transposed vector. In this case, there are two values for the "u" variables, $u_1$ and $u_2$, such that i=1, 2, and there may be four values for the "y" variables, $y_1$, $y_2$, $y_3$, $y_4$, such that i=1, 2, 3, 4. As explained above, the $y_{ref}$ and $u_{ref}$ values may be determined by the steady state optimizer module 200.

The plurality of costs may be determined even more particularly with the following equation (14), which is an MPC equation having a prediction horizon of three and a control horizon of two:

$$\begin{aligned}\text{Cost} = &\{\lambda_a*(Ta\_a_k - Ta\_dr)^2 + \lambda_a*(Ta\_a_{k+1} - Ta\_dr)^2 + \lambda_a* \\ &(Ta\_a_{k+2} - Ta\_dr)^2\} + \{\lambda_f*(FR\_a_k - FR\_r)^2 + \lambda_f* \\ &(FR\_a_{k+1} - FR\_r)^2 + \lambda_f*(FR\_a_{k+2} - FR\_r)^2\} + \{\lambda_e* \\ &(Te\_c_k - Te\_r)^2 + \lambda_e*(Te\_c_{k+1} - Te\_r)^2\} + \{\lambda_r* \\ &(Rat\_c_k - Rat\_r)^2 + \lambda_r*(Rat\_c_{k+1} - Rat\_r)^2\} + \{\lambda_{\Delta r}* \\ &(\Delta Rat\_c_k)^2 + \lambda_{\Delta r}*(\Delta Rat\_c_{k+1})^2\} + \{\lambda_{\Delta e}*(\Delta Te\_c_k)^2 + \\ &\lambda_{\Delta e}*(\Delta Te\_c_{k+1})^2\}\end{aligned} \quad (14)$$

where $\lambda_a$=a first predetermined weighting value; Ta_$a_k$=predicted actual axle torque at a prediction step k; Ta_dr=driver axle torque requested; Ta_$a_{k+1}$=predicted actual axle torque at a prediction step k+1; Ta_$a_{k+2}$=predicted actual axle torque at a prediction step k+2; $\lambda_f$=a second predetermined weighting value; FR_$a_k$=predicted actual fuel consumption rate at the prediction step k; FR_r=fuel consumption rate requested; FR_$a_{k+1}$=predicted actual fuel consumption rate at the prediction step k+1; FR_$a_{k+2}$=predicted actual fuel consumption rate at the prediction step k+2; $\lambda_e$=a third predetermined weighting value; Te_$c_k$=engine output torque commanded at the prediction step k; Te_r=engine output torque requested; Te_$c_{k+1}$=engine output torque commanded at the prediction step k+1; $\lambda_r$=a fourth predetermined weighting value; Rat_$c_k$=transmission ratio commanded at the prediction step k; Rat_r=transmission ratio requested; Rat_$c_{k+1}$=transmission ratio commanded at the prediction step k+1; $\lambda_{\Delta r}$=a fifth predetermined weighting value; ΔRat_$c_k$=change in transmission ratio commanded at the prediction step k; ΔRat_$c_{k+1}$=change in transmission ratio commanded at the prediction step k+1; $\lambda_{\Delta e}$=a sixth predetermined weighting value; ΔTe_$c_k$=change in engine output torque commanded at the prediction step k; and ΔTe_$c_{k+1}$=change in engine output torque commanded at the prediction step k+1. The prediction step k is the prediction at a current step, the prediction step k+1 is a prediction one step ahead, and the prediction step k+2 is a prediction two steps ahead. As explained above, the y_ref and u_ref values may be determined by the steady state optimizer module 200.

The cost equation (e.g., equation (13) or (14)) may be applied iteratively to arrive at the lowest cost for a plurality of sets of possible command values Te_c, Rat_c, where the plurality of sets of possible command values Te_c, Rat_c include the first and second sets of possible command values as well as a number of other possible sets of command values for Te_c, Rat_c. Then, the selection module 210 may select the set of possible command values Te_c, Rat_c of the plurality of command values having the lowest cost, where the set of possible command values Te_c, Rat_c having the lowest cost may be defined as the selected set, including the selected transmission ratio value Rat_c and the selected engine output torque value Te_c. Similarly, the cost module 208 may generate a surface representing the cost of possible sets of command values Te_c, Rat_c. The cost module 208 and/or the selection module 210 may then identify the possible set that has the lowest cost based on the slope of the cost surface.

The prediction module 204 may provide a number of predicted actual values 206 to the MPC module 202 for use in the cost equation (e.g., equation (13) or (14)) by the cost module 208. The prediction module 204 may use equations such as the following to determine the predicted actual values 206:

$$y_k = C * x_k + w \quad (15)$$

$$y_{k+1} = C * x_{k+1} + w \quad (16)$$

-continued $$x_{k+1} = A * x_k + B * u_k + v + K_{KF} * (y_k - y_{mk}) \quad (17)$$

$$y = \begin{bmatrix} Te\_a_k \\ FR\_a_k \\ Rat\_a_k \\ Ta\_a_k \end{bmatrix} \quad y_{k+1} = \begin{bmatrix} Te\_a_{k+1} \\ FR\_a_{k+1} \\ Rat\_a_{k+1} \\ Ta\_a_{k+1} \end{bmatrix}$$

$$u_k = \begin{bmatrix} Te\_c_k, Te\_c\_arb \\ Rat\_c_k \end{bmatrix} \quad y_{mk} = \begin{bmatrix} Te\_a\_m_k \\ FR\_a\_m_k \\ Rat\_a\_m_k \\ Ta\_a\_m_k \end{bmatrix}$$

where A=a state (or transmission) matrix; B=an input matrix; C=an output (or measured) matrix; Te_$a_k$=predicted actual engine output torque at the prediction step k; FR_$a_k$=predicted actual fuel consumption rate at the prediction step k; Rat_$a_k$=predicted actual transmission ratio at the prediction step k; Ta_$a_k$=predicted actual axle torque at the prediction step k; $x_k$=state variable at a prediction step k; Te_$a_{k+1}$=predicted actual engine output torque at the prediction step k+1; FR_$a_{k+1}$=predicted actual fuel consumption rate at the prediction step k+1; Rat_$a_{k+1}$=predicted actual transmission ratio at the prediction step k+1; Ta_$a_{k+1}$=predicted actual axle torque at the prediction step k+1; $x_{k+1}$=state variable at a prediction step k+1; Te_$c_k$=engine output torque commanded at the prediction step k, which could be substituted by Te_c_arb=arbitrated engine output torque commanded; Rat_$c_k$=transmission ratio commanded at the prediction step k; $K_{KF}$=a Kalman filter gain; Te_a_$m_k$=measured engine output torque at the prediction step k; FR_a_$m_k$=measured fuel consumption rate at the prediction step k; Rat_a_$m_k$=measured transmission ratio at the prediction step k; Ta_a_$m_k$=measured axle torque at the prediction step k; v=process noise; and w=measurement noise. The prediction step k is a prediction step at the current time (e.g., now), and the prediction step k+1 is a prediction one step ahead.

Measured engine output torque Te_m may be sensed from the engine torque sensor S4. The measured transmission ratio, or pulley ratio, Rat_m may be determined from the speed of the transmission input shaft 22 sensed by the transmission input shaft speed sensor S6 and the speed of the transmission output shaft 26 sensed by the transmission output shaft speed sensor S8, and may be provided by the TCM 40.

Ta_$a_{k+1}$ and FR_$a_{k+1}$ may be defined as or equal to the first predicted actual axle torque value and the first predicted actual fuel consumption rate value, respectively, when generated based on the first set of possible command values for Te_$c_k$ and Rat_$c_k$, and Ta_$a_{k+1}$ and FR_$a_{k+1}$ may be defined as or equal to the second predicted actual axle torque value and the second predicted actual fuel consumption rate value, respectively, when generated based on the second set of possible command values for Te_$c_k$ and Rat_$c_k$, and so on.

The cost equation (e.g., equation (13) or (14)) may be subject to the following constraints 105, 107:

$$Te_{min} \leq Te\_c_k \leq Te_{max};$$

$$Te_{min} \leq Te\_c_{k+1} \leq Te_{max};$$

$$Rat_{min} \leq Rat\_c_{k+1} \leq Rat_{max};$$

$$Rat_{min} \leq Rat\_c_{k+1} \leq Rat_{max};$$

$$\Delta Rat\_c_{min} \leq \Delta Rat\_c_k \leq \Delta Rat\_c_{max};$$

$\Delta Rat\_c_{min} \leq \Delta Rat\_c_{k+1} \leq \Delta Rat\_c_{max}$;

$\Delta Te\_c_{min} \leq \Delta Te\_c_k \leq \Delta Te\_c_{max}$; and $\Delta Te\_c_{min} \leq \Delta Te\_c_{k+1} \leq \Delta Te\_c_{max}$, where $Te_{min}$=a minimum possible engine output torque, $Te_{max}$=a maximum possible engine output torque, $Rat_{min}$=a minimum possible transmission ratio, $Rat_{max}$=a maximum possible transmission ratio, $\Delta Rat\_c_{min}$=a minimum possible rate of change in transmission ratio; $\Delta Rat\_c_{max}$=a maximum possible rate of change in transmission ratio, $\Delta Te\_c_{min}$=a minimum possible rate of change in engine output torque, and $\Delta Te\_c_{max}$=a maximum possible rate of change in engine output torque, where the constraints 105, 107 may be provided by the ECM 38 and the TCM 40, by way of example.

The constants, matrices, and gain referred to above, including A, B, C, $K_{KF}$, $Q_y$, $Q_u$, $Q_{\Delta u}$, $\lambda_a$, $\lambda_f$, $\lambda_e$, $\lambda_r$, $\lambda_{\Delta e}$, $\lambda_{\Delta r}$, are parameters of the system determined through testing, physical models, or other means. In some variations, a system identification procedure is run offline, for example, during a calibration, to identify the constants, matrices, and gain, and also to define $u_0$ and $y_0$. Once $u_0$ and $y_0$ are known, then $x_0$ can be computed from the prediction module equations (e.g., equations (15)-(17) or a subset thereof). Thereafter, each of the prediction module 204 and MPC module 202 equations (e.g., equations (13)-(17) or a subset thereof) can be run to obtain initial values offline. Then, the control system 102 can be run online to constantly optimize the controlled parameters Te_c and Rat_c as the vehicle 9 is running through steady state and transient states. The constants allow the cost to be determined based on the relationship between and relative importance of each of the commanded values Te_c, Rat_c and tracked values (e.g., FR_m, Ta_m, Rat_m, Te_m). The relationships are weighted to control the effect that each relationship has on the cost.

In some forms, the MPC module 202 may generate the possible sets of command values Te_c, Rat_c by determining possible sequences, sets, or a surface containing the command values Te_c, Rat_c that could be used for N future control loops. The prediction module 204 may determine predicted responses to the possible sets of the command values Te_c, Rat_c using the prediction module equations (e.g., equations (15)-(17) or a subset thereof). For example, the prediction module 204 may determine a set of predicted actual axle torques Ta_a and a set of predicted actual fuel consumption rates FR_a for N control loops.

More particularly, a set of N values for each command value Te_c, Rat_c may be determined, and a set of M values for each predicted actual value Ta_a, FR_a may be determined based on the N command values Te_c, Rat_c. The cost module 208 may then determine the cost value for each of the possible sets of command values Te_c, Rat_c based on the predicted actual parameters Ta_a, FR_a (which may include $Ta\_a_k$, $Ta\_a_{k+1}$, $Ta\_a_{k+2}$, $FR\_a_k$, $FR\_a_{k+1}$, and $FR\_a_{k+2}$, depending on the particular cost equation (13), (14) used). The selection module 210 may then select one of the possible sets of the command values Te_c, Rat_c based on the costs of the possible sets, respectively. For example, the selection module 210 may select the possible set of command values Te_c, Rat_c having the lowest cost while satisfying the system constraints 105, 107 (e.g., $Te_{min} < Te\_c_k < Te_{max}$; $Te_{min} < Te\_c_{k+1} < Te_{max}$; $Rat_{min} < Rat\_c_k < Rat_{max}$; $Rat_{min} < Rat\_c_{k+1} < Rat_{max}$; $\Delta Te\_c_{min} < \Delta Te\_c_k < \Delta Te\_c_{max}$; $\Delta Te\_c_{min} < \Delta Te\_c_{k+1} < \Delta Te\_c_{max}$; $\Delta Rat\_c_{min} < \Delta Rat\_c_k < \Delta Rat\_c_{max}$; $\Delta Rat\_c_{min} < \Delta Rat\_c_{k+1} < \Delta Rat\_c_{max}$).

In some forms, satisfaction of the constraints 105, 107 may be considered in the cost determination. For example, the cost module 208 may determine the cost values further based on the constraints 105, 107, and the selection module 210 may select the possible set of command values Te_c, Rat_c that best achieves the axle torque request Ta while minimizing fuel consumption rate FR that has been determined to comply with the constraints 105, 107.

During steady-state operation, the command values Te_c, Rat_c may settle at or near the reference, or requested, values Te_r, Rat_r, respectively. During transient operation, however, the MPC module 202 may adjust the command values Te_c, Rat_c away from the reference values Te_r, Rat_r in order to best achieve the torque request Ta_r, while minimizing the fuel consumption rate FR and satisfying the constraints 105, 107.

In operation, the MPC module 202 may determine the cost values for the possible sets of controlled and predicted values (u, y). The MPC module 202 may then select the one of the possible sets having the lowest cost. The MPC module 202 may next determine whether the selected possible set satisfies the constraints 105, 107. If so, the possible set may be defined as the selected set. If not, the MPC module 202 determines the set with the lowest cost that satisfies the constraints 105, 107 and defines that set as the selected set. The selected Rat_c command value is output from the MPC module 202 to the plant 103 (see FIG. 4).

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 100 may be configured to execute each of the steps of a method, as defined in the claims. Thus, the entire description with respect to FIGS. 1-6 may be applied by the control system 100 to effectuate the method, as claimed. Furthermore, the control system 100 may be or include a controller that includes a number of control logics that are configured to execute the steps of the method.

The controller(s) of the control system 100 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the disclosure as defined in the appended claims.

What is claimed is:

1. A method for controlling a propulsion system of a motor vehicle, the method comprising:
    generating a plurality of sets of possible command values;
    determining a cost for each set of possible command values of the plurality of sets of possible command values based on a first predetermined weighting value, a second predetermined weighting value, a plurality of predicted values, and a plurality of requested values, the plurality of requested values including a fuel consumption rate requested value;
    determining the fuel consumption rate requested value based on an air-per-cylinder (APC) requested value;
    determining which set of possible command values of the plurality of sets of possible command values has a lowest cost;
    selecting the set of possible command values that has the lowest cost to define a set of selected command values; and
    controlling a vehicle parameter based on the selected command value.

2. The method of claim 1, further comprising selecting the APC requested value from the lower of a computed APC reference value and a measured APC value.

3. The method of claim 2, further comprising determining the computed APC reference value based on an estimated engine speed and an axle power requested value.

4. The method of claim 2, further comprising determining the computed APC reference value based on a raw APC reference value ($APC_{r\_raw}$), the method further comprising determining the raw APC reference value ($APC_{r\_raw}$) based on the following equation:

$$APC_{r\_raw} = k * \frac{P_{a\_r} * FP * AF}{c * RPM}$$

where $APC_{r\_raw}$ is the raw APC reference value, k is a constant, $P_{a\_r}$ is an axle power requested value, FP is a firing period, AF is an air/fuel ratio, c is an engine power-to-fuel ratio, and RPM is an estimated engine speed.

5. The method of claim 4, further comprising determining the axle power requested value ($P_{a\_r}$) based on the following equation:

$$P_{a\_r} = \frac{Ta\_r * V}{radius * 3600}$$

where $P_{a\_r}$ is the axle power requested value, Ta_r is an axle torque requested value, V is vehicle speed, and radius is wheel radius.

6. The method of claim 5, further comprising determining the engine power-to-fuel ratio c based on an engine power requested value divided by a fuel requested value, wherein each of the engine power requested value and the fuel requested value are functions of the estimated engine speed (RPM) and an engine torque requested value, the method further comprising determining the estimated engine speed (RPM) based on the vehicle speed (V) and a transmission ratio requested value.

7. The method of claim 6, wherein the plurality of sets of possible command values includes a plurality of commanded engine output torque values and the set of selected command values includes a selected engine output torque value, the method further comprising:
    generating a plurality of predicted actual axle torque values and a plurality of predicted actual fuel consumption rate values based on the plurality of sets of possible command values, the plurality of sets of possible command values including a plurality of possible commanded transmission ratio values; and determining the cost for each set of possible command values further based on a predicted actual axle torque value of the plurality of predicted axle torque values and a predicted actual fuel consumption rate value of the plurality of predicted actual fuel consumption rate values.

8. The method of claim 7, further comprising determining the plurality of predicted actual axle torque values and the plurality of predicted actual fuel consumption rate values with the following set of equations:

$$x_{k+1} = \left\{A * x_k + B * \begin{bmatrix} Te\_c \\ Rat\_c_k \end{bmatrix} + v\right\} + K_{KF} * \left(\begin{bmatrix} Te\_m_k \\ FR\_m_k \\ Rat\_m_k \\ Ta\_m_k \end{bmatrix} - \begin{bmatrix} Te\_a_k \\ FR\_a_k \\ Rat\_a_k \\ Ta\_a_k \end{bmatrix}\right)$$

$$\begin{bmatrix} Ta\_a_{k+1} \\ FR\_a_{k+1} \end{bmatrix} = C * x_{k+1} + w$$

where $x_{k+1}$=state variable at a prediction step k+1;
$x_k$=state variable at a prediction step k;
A=a state matrix;
B=an input matrix;
Te_c=engine output torque commanded at the prediction step k;
$Rat\_c_k$=transmission ratio commanded at the prediction step k;
$K_{KF}$=Kalman filter gain;
$Te\_a_k$=predicted actual engine output torque at the prediction step k;
$FR\_a_k$=predicted actual fuel consumption rate at the prediction step k;
$Rat\_a_k$=predicted actual transmission ratio at the prediction step k;
$Ta\_a_k$=predicted actual axle torque at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k;
$Ta\_a_{k+1}$=predicted actual axle torque at the prediction step k+1;
$FR\_a_{k+1}$=predicted actual fuel consumption rate at the prediction step k+1;
C=an output matrix;
v=process noise; and
w=measurement noise.

9. The method of claim 8, further comprising determining the plurality of costs with the following cost equation:

$$Cost = \Sigma (y(i|k) - y_{ref})^T Q_Y (y(i|k) - y_{ref}) + $$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix} \quad y_{ref} = \begin{bmatrix} Te\_r \\ FR\_r \\ Rat\_r \\ Ta\_r \end{bmatrix}$$

-continued $$u = \begin{bmatrix} Te\_c \\ Rat\_c \end{bmatrix} \quad u_{ref} = \begin{bmatrix} Te\_r \\ Rat\_r \end{bmatrix}$$

where

Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
Te_c=commanded engine output torque;
Rat_c=commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

10. A control system for a propulsion system of a motor vehicle having a transmission and an engine, the control system comprising:
a command generator module configured to generate a plurality of sets of possible command values;
a cost module configured to:
determine a cost for each set of possible command values of the plurality of sets of possible command values based on a first predetermined weighting value, a second predetermined weighting value, a plurality of predicted values, and a plurality of requested values, the plurality of requested values including a fuel consumption rate requested value determined based on an air-per-cylinder (APC) requested value; and
determine which set of possible command values of the plurality of sets of possible command values has a lowest cost;
a selection module configured to select the set of possible command values that has the lowest cost to define a set of selected command values; and
an actuation module configured to control a vehicle parameter based on the selected command value.

11. The control system of claim 10, at least one selected command value of the set of selected command values being a selected engine output torque value, the control system further comprising a prediction module configured to generate a plurality of predicted actual axle torque values and a plurality of predicted actual fuel consumption rate values based on the plurality of sets of possible command values, the plurality of sets of possible command values including a plurality of possible commanded transmission ratio values and a plurality of possible commanded engine torque values, wherein the cost module is configured to determine the cost for each set of possible command values further based on a predicted actual axle torque value of the plurality of predicted axle torque values and a predicted actual fuel consumption rate value of the plurality of predicted actual fuel consumption rate values, the plurality of requested values including the fuel consumption rate requested value, an axle torque requested value, an engine output torque requested value, and a transmission ratio requested value.

12. The control system of claim 11, wherein the control system is configured to determine the APC requested value based on the lower of a computed APC reference value and a measured APC value, and wherein the control system is configured to determine the computed APC reference value based on an estimated engine speed and an axle power requested value.

13. The control system of claim 12, wherein the control system is configured to determine the computed APC reference value based on a raw APC reference value (APC$_{r\_raw}$), the raw APC reference value (APC$_{r\_raw}$) being determined based on the following equation:

$$APC_{r\_raw} = k * \frac{P_{a\_r} * FP * AF}{c * RPM}$$

where APC$_{r\_raw}$ is the raw APC reference value, k is a constant, P$_{a\_r}$ is the axle power requested value, FP is a firing period, AF is an air/fuel ratio, c is an engine power-to-fuel ratio, and RPM is the estimated engine speed.

14. The control system of claim 13, wherein the control system is configured to determine the axle requested power value (P$_{a\_r}$) based on the following equation:

$$P_{a\_r} = \frac{Ta\_r * V}{radius * 3600}$$

where P$_{a\_r}$ is the axle power requested value, Ta_r is the axle torque requested value, V is vehicle speed, and radius is wheel radius, and wherein the control system is configured to determine the engine power-to-fuel ratio c based on an engine power requested value divided by a fuel requested value, wherein each of the engine power requested value and the fuel requested value are functions of the estimated engine speed (RPM) and the engine torque requested value, wherein the estimated engine speed (RPM) is based on the vehicle speed (V) and the transmission ratio requested value.

15. The control system of claim 14, wherein the plurality of sets of possible command values includes a plurality of commanded engine output torque values and the set of selected command values includes a selected engine output torque value, the prediction module being further configured to generate a plurality of predicted actual axle torque values and a plurality of predicted actual fuel consumption rate values based on the plurality of sets of possible command values, the plurality of sets of possible command values including a plurality of possible commanded transmission ratio values, and cost module being further configured to determine the cost for each set of possible command values further based on a predicted actual axle torque value of the plurality of predicted axle torque values and a predicted actual fuel consumption rate value of the plurality of predicted actual fuel consumption rate values.

16. The control system of claim 15, wherein the prediction module is configured to determine the plurality of predicted actual axle torque values and the plurality of predicted actual fuel consumption rate values with the following set of equations:

$$x_{k+1} = \left\{ A * x_k + B * \begin{bmatrix} Te\_c \\ Rat\_c_k \end{bmatrix} + v \right\} + K_{KF} * \left( \begin{bmatrix} Te\_m_k \\ FR\_m_k \\ Rat\_m_k \\ Ta\_m_k \end{bmatrix} - \begin{bmatrix} Te\_a_k \\ FR\_a_k \\ Rat\_a_k \\ Ta\_a_k \end{bmatrix} \right)$$

$$\begin{bmatrix} Ta\_a_{k+1} \\ FR\_a_{k+1} \end{bmatrix} = C * x_{k+1} + w$$

where x$_{k+1}$=state variable at a prediction step k+1;
x$_k$=state variable at a prediction step k;
A=a state matrix;
B=an input matrix;
Te_c=engine output torque commanded at the prediction step k;
Rat_c$_k$=transmission ratio commanded at the prediction step k;
K$_{KF}$=a Kalman filter gain;
Te_a$_k$=predicted actual engine output torque at the prediction step k;
FR_a$_k$=predicted actual fuel consumption rate at the prediction step k;
Rat_a$_k$=predicted actual transmission ratio at the prediction step k;
Ta_a$_k$=predicted actual axle torque at the prediction step k;
Te_m$_k$=measured engine output torque at the prediction step k;
FR_m$_k$=measured fuel consumption rate at the prediction step k;
Rat_m$_k$=measured transmission ratio at the prediction step k;
Ta_m$_k$=measured axle torque at the prediction step k;
Ta_a$_{k+1}$=predicted actual axle torque at the prediction step k+1;
FR_a$_{k+1}$=predicted actual fuel consumption rate at the prediction step k+1;
C=an output matrix;
v=process noise; and
w=measurement noise.

17. The control system of claim 16, wherein the cost module is configured to determine the plurality of costs with the following cost equation:

$$\text{Cost} = \Sigma (y(i|k) - y_{ref})^T Q_Y (y(i|k) - y_{ref}) +$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix} \quad y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix} \quad u_{ref} = \begin{bmatrix} Te\_r \\ Rat\_r \end{bmatrix}$$

where
Te_a=predicted actual engine output torque;
FR_a=predicted actual fuel consumption rate;
Rat_a=predicted actual transmission ratio;
Ta_a=predicted actual axle torque;
Te_r=engine output torque requested;
FR_r=fuel consumption rate requested;
Rat_r=transmission ratio requested;
Ta_r=axle torque requested;
Te_c=commanded engine output torque;
Rat_c=commanded transmission ratio;
Q$_y$=the first predetermined weighting value;

$Q_u$=the second predetermined weighting value;
$Q_{\Delta u}$=a third predetermined weighting value;
i=index value;
k=prediction step; and
T=transposed vector.

18. The control system of claim 17, further comprising a steady state optimizer module configured to:
   determine an accelerator pedal position (PP);
   determine the estimated engine speed (RPM);
   determine the vehicle speed (V);
   determine the air-fuel ratio (AF);
   determine the axle torque requested value (Ta_r) based on the accelerator pedal position (PP) and the vehicle speed (V);
   determine the transmission ratio requested value (Rat_r) based on the axle torque requested value (Ta_r) and the vehicle speed (V);
   determine the engine output torque requested value (Te_r) based on the axle torque requested value (Ta_r), the transmission ratio requested value (Rat_r), and a final drive ratio (FD); and
   determine the APC requested value.

19. A propulsion system for a motor vehicle, comprising:
   an engine operable to power the motor vehicle, the engine having an engine output shaft configured to transfer engine output torque;
   a continuously variable transmission having a variator assembly including a first pulley and a second pulley, the first and second pulleys being rotatably coupled by a rotatable member, at least one of the first and second pulleys including a movable sheave translatable along an axis to selectively change a transmission ratio between the engine output shaft and a transmission output shaft;
   a drive axle configured to be driven via the transmission output shaft, the drive axle being configured to output axle torque to a set of wheels; and
   a control system comprising:
      a prediction module configured to generate a plurality of predicted actual axle torque values and a plurality of predicted actual fuel consumption rate values based on a plurality of sets of possible command values, the plurality of sets of possible command values including a plurality of possible commanded transmission ratio values and a plurality of possible commanded engine torque values;
      a steady-state optimizer module configured to determine a fuel consumption rate requested value based on an air-to-cylinder (APC) requested value determined based at least in part on a raw APC reference value determined based on the following equation:

$$APC_{r\_raw} = k * \frac{P_{a\_r} * FP * AF}{c * RPM}$$

where $APC_{r\_raw}$ is the raw APC reference value, k is a constant, $P_{a\_r}$ is an axle power requested value, FP is a firing period, AF is an air/fuel ratio, c is an engine power-to-fuel ratio, and RPM is an estimated engine speed;
      a cost module configured to:
         determine a cost for each set of possible command values of the plurality of sets of possible command values based on a predicted actual axle torque value of the plurality of predicted axle torque values, a predicted actual fuel consumption rate value of the plurality of predicted actual fuel consumption rate values, a first predetermined weighting value, a second predetermined weighting value, and a plurality of requested values, the plurality of requested values including an axle torque requested value, an engine output torque requested value, a transmission ratio requested value, and the fuel consumption rate requested value; and
         determine which set of possible command values of the plurality of sets of possible command values has a lowest cost;
      a selection module configured to select the set of possible command values that has the lowest cost to define a set of selected command values; and
      an actuation module configured to control a vehicle parameter based on the selected command value.

20. The propulsion system of claim 19, wherein the prediction module is configured to determine the plurality of predicted actual axle torque values and the plurality of predicted actual fuel consumption rate values with the following set of equations:

$$x_{k+1} = \left\{ A*x_k + B*\begin{bmatrix} Te\_c \\ Rat\_c_k \end{bmatrix} + v \right\} + K_{KF} * \left( \begin{bmatrix} Te\_m_k \\ FR\_m_k \\ Rat\_m_k \\ Ta\_m_k \end{bmatrix} - \begin{bmatrix} Te\_a_k \\ FR\_a_k \\ Rat\_a_k \\ Ta\_a_k \end{bmatrix} \right)$$

$$\begin{bmatrix} Ta\_a_{k+1} \\ FR\_a_{k+1} \end{bmatrix} = C*x_{k+1} + w$$

where
$x_{k+1}$=state variable at a prediction step k+1;
$x_k$=state variable at a prediction step k;
A=a state matrix;
B=an input matrix;
Te_c=engine output torque commanded at the prediction step k;
$Rat\_c_k$=transmission ratio commanded at the prediction step k;
$K_{KF}$=a Kalman filter gain;
$Te\_a_k$=predicted actual engine output torque at the prediction step k;
$FR\_a_k$=predicted actual fuel consumption rate at the prediction step k;
$Rat\_a_k$=predicted actual transmission ratio at the prediction step k;
$Ta\_a_k$=predicted actual axle torque at the prediction step k;
$Te\_m_k$=measured engine output torque at the prediction step k;
$FR\_m_k$=measured fuel consumption rate at the prediction step k;
$Rat\_m_k$=measured transmission ratio at the prediction step k;
$Ta\_m_k$=measured axle torque at the prediction step k;
$Ta\_a_{k+1}$=predicted actual axle torque at the prediction step k+1;
$FR\_a_{k+1}$=predicted actual fuel consumption rate at the prediction step k+1;
C=an output matrix;
v=process noise; and
w=measurement noise, wherein the steady state optimizer module is configured to determine the APC requested value based on the lower of a computed APC reference value and a measured APC value, the steady state optimizer module being configured to determine the computed APC reference value based on the raw APC reference value ($APC_{r\_raw}$), the steady state optimizer module being configured to determine the axle requested power value ($P_{a\_r}$) based on the following equation:

$$P_{a\_r} = \frac{Ta\_r * V}{radius * 3600}$$

where $P_{a\_r}$ is the axle power requested value, Ta_r is the axle torque requested value, V is vehicle speed, and radius is wheel radius, and wherein the steady state optimizer module is configured to determine the engine power-to-fuel ratio c based on an engine power requested value divided by a fuel requested value, wherein each of the engine power requested value and the fuel requested value are functions of the estimated engine speed (RPM) and the engine torque requested value, wherein the estimated engine speed (RPM) is based on the vehicle speed (V) and the transmission ratio requested value.

\* \* \* \* \*